A. BELCHAMBERS.
Riding-Plow.
No. 220,790. Patented Oct. 21, 1879.
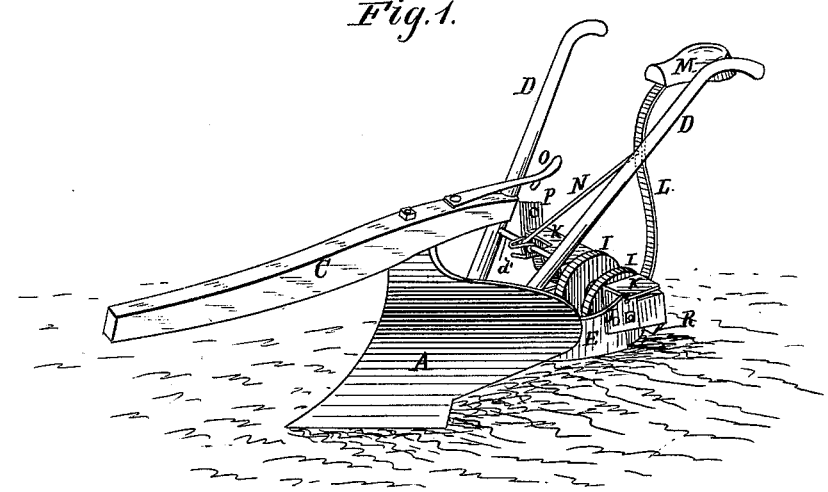
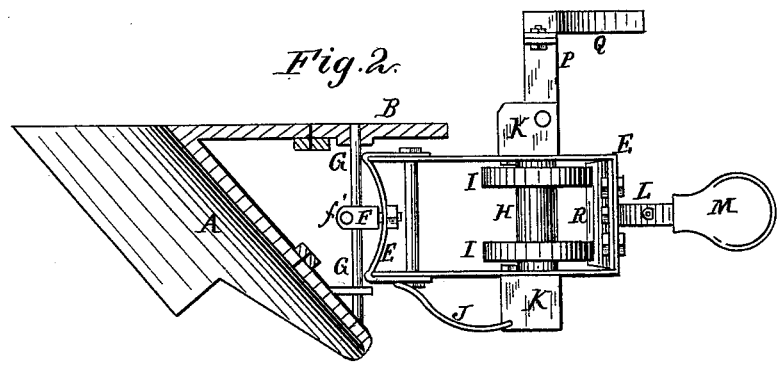
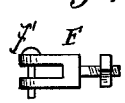
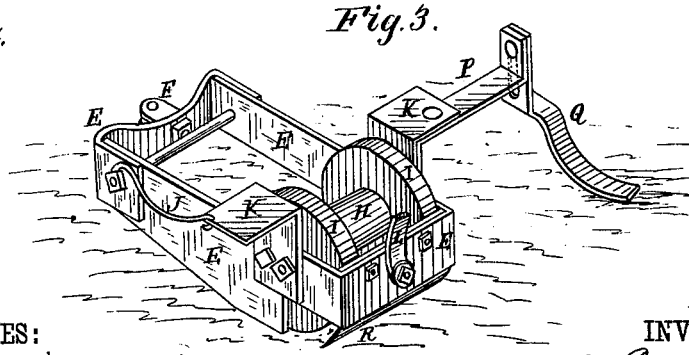
WITNESSES:
Henry N. Miller
C. Sedgwick
INVENTOR:
A. Belchambers
BY Munn & Co.
ATTORNEYS.

UNITED STATES PATENT OFFICE.

ALFRED BELCHAMBERS, OF RIPLEY, OHIO.

IMPROVEMENT IN RIDING-PLOWS.

Specification forming part of Letters Patent No. 220,790, dated October 21, 1879; application filed March 15, 1879.

*To all whom it may concern:*

Be it known that I, ALFRED BELCHAMBERS, of Ripley, in the county of Brown and State of Ohio, have invented a new and useful Improvement in Riding-Plows, of which the following is a specification.

Figure 1 is a perspective view of a plow to which my improvement has been applied. Fig. 2 is a top view of the same, the plow being shown in horizontal section. Fig. 3 is a detail perspective view of the attachment. Fig. 4 is a detail view of the coupling.

Similar letters of reference indicate corresponding parts.

The object of this invention is to furnish an improved riding attachment for plows, which shall be simple in construction, convenient in use, and inexpensive in manufacture, which shall be so constructed that the weight of the plowman may balance the weight of the plow, making the draft less than that of a walking-plow, and that it may be very quickly attached and detached, as may be required.

The invention consists in combining with an ordinary plow having transverse bolt a riding attachment composed of frame, axle, wheel or wheels, arm, sliding foot, and slotted bolt, as hereinafter described.

A represents the mold-board, B the land-side, C the beam, and D the handles, of an ordinary plow. E is a rectangular frame, of such a width as to pass freely along the furrow opened by the plow, and two feet or more in length.

To the center of the front end bar of the frame E is secured, by a nut or other substantial means, a bolt, F, the forward part of which is slotted to receive a horizontal rod or bolt, G, and which is secured to the said rod or bolt G by a drop-pin, $f'$, so that the frame E and its attachments can be instantly attached and detached, as may be required, by simply inserting and withdrawing the said pin $f'$. The ends of the rod or bolt G are firmly secured to the mold-board A and the land-side B of the plow.

To the rear parts of the side bars of the frame E are attached the ends of a rod or axle, H, upon which revolves a wide-faced wheel, I, or two narrow-faced wheels, I.

When two wheels I are used they should be placed upon the axle H, close to the inner sides of the side bars of the frame E.

The wheel or wheels I roll along the smooth level bottom of the furrow opened by the plow, and thus always have an unobstructed path.

The side bar of the frame E next to the plowed land is extended downward nearly to the ground to act as a fender to prevent any sods or soil from falling into the furrow in front of the wheel or wheels I, and thus obstructing them. The falling of sods into the furrow is still farther guarded against by the rod J, the forward end of which is attached to the forward part of the plowed-land side bar of the frame E.

The rod J is curved outward and rearward, and its rear end is attached to the outer forward corner of the foot-rest K, one of which is attached to each side bar of the frame E for the plowman to rest his feet upon.

To the center of the rear end bar of the frame E is attached the lower end of the curved spring-standard L, to the upper end of which is attached the seat M for the plowman. The spring-standard L should have a slight lateral adjustment, so that the seat M may be kept level when plowing upon inclined ground.

To the upper part of the spring-standard L is attached the rear end of a rod, N, which has a hook formed upon its forward end to hook around a round, $d'$, of the handles D, where it is kept from getting out of place by a loop or keeper attached to the said rod or round $d'$.

To the upper side of the rear end of the plow-beam C is attached a spring-catch, O, to catch upon the frame E and support the riding attachment away from the ground when required for convenience in turning around.

To the side bar of the frame E upon the unplowed-land side is attached an outwardly-projecting arm, P, the outer end of which is bent upward, and to it is attached the upwardly-projecting inner end of the foot Q. The outer part of the foot Q is curved to the rearward, so as to slide easily upon the unplowed land.

The upwardly-projecting part of the arm P or of the foot Q should have a number of holes or a slot formed in it to receive the fastening-bolt, so that the said foot may be adjusted as the depth of the furrow may require.

The foot Q should be adjusted so as to just touch the ground to give steadiness to the attachment, and it is especially designed for use when passing from place to place, so that the plow may be supported by the wheels I and the foot Q.

To the rear end bar of the frame E is attached a plate, R, the lower edge of which projects downward and inclines inward into such a position as to scrape off any soil that may adhere to the face or faces of the wheel or wheels I.

Having thus described my invention, I claim as new and desire to secure by Letters Patent—

In combination with an ordinary plow, A B C D, having transverse bolt G, the riding attachment composed of frame E, axle H, wheel or wheels I, arm P, sliding foot Q, and slotted bolt F, all constructed and arranged to operate as described.

ALFRED BELCHAMBERS.

Witnesses:
JOHN McCAGEN,
GEORGE W. HARDING.